United States Patent
Ichimura

(10) Patent No.: US 12,522,478 B2
(45) Date of Patent: Jan. 13, 2026

(54) PORT CARGO HANDLING DEVICE AND CONTROL METHOD THEREFOR

(71) Applicant: MITSUI E&S CO., LTD., Tokyo (JP)

(72) Inventor: Kinya Ichimura, Tokyo (JP)

(73) Assignee: Mitsui E&S Co., Ltd., Tokyo (JP)

( * ) Notice: Subject to any disclaimer, the term of this patent is extended or adjusted under 35 U.S.C. 154(b) by 187 days.

(21) Appl. No.: 18/293,113

(22) PCT Filed: Jul. 30, 2021

(86) PCT No.: PCT/JP2021/028331
§ 371 (c)(1),
(2) Date: Jan. 29, 2024

(87) PCT Pub. No.: WO2023/007701
PCT Pub. Date: Feb. 2, 2023

(65) Prior Publication Data
US 2024/0367947 A1 Nov. 7, 2024

(51) Int. Cl.
*B66C 13/24* (2006.01)
*B66C 13/12* (2006.01)
*B66C 19/00* (2006.01)

(52) U.S. Cl.
CPC .............. *B66C 13/24* (2013.01); *B66C 13/12* (2013.01); *B66C 19/007* (2013.01)

(58) Field of Classification Search
CPC ......... B66C 13/24; B66C 19/007; B66C 1/68; B66C 13/12; B66C 13/48; B66C 13/22;

(Continued)

(56) References Cited

U.S. PATENT DOCUMENTS

| 2006/0061307 A1 | 3/2006 | Donnelly |
| 2008/0048497 A1 | 2/2008 | Donnelly et al. |

FOREIGN PATENT DOCUMENTS

| EP | 2354075 A1 * | 8/2011 | ............. B66C 13/12 |
| JP | 2003-137494 A | 5/2003 | |

(Continued)

OTHER PUBLICATIONS

"Yoshioka Nobuo, Power feeding device and rubber tired gantry crane including the same, Aug. 10, 2011, Clarivate Analytics, pp. 1-36" (Year: 2011).*

*Primary Examiner* — Antony M Paul
(74) *Attorney, Agent, or Firm* — Carrier, Shende & Associates P.C.; Joseph P. Carrier; Fulchand P. Shende

(57) ABSTRACT

Provided is a port cargo handling device capable of reducing the carbon dioxide emissions at a container terminal and a method of controlling the same. A power generation mechanism 9 and an inverter 8 are connected by a cable 11 that carries DC electricity, and a storage battery 10 is connected to the cable 11. The power generation mechanism 9 is switched from a first power generation mechanism 9a to a second power generation mechanism 9b by disconnecting the first power generation mechanism 9a from the cable 11 and connecting the second power generation mechanism 9b to the cable 11, the first power generation mechanism 9a being mounted as the power generation mechanism 9 on the port cargo handling device, the second power generation mechanism 9b having a fuel different from that of the first power generation mechanism 9a.

9 Claims, 3 Drawing Sheets

(58) Field of Classification Search
CPC ....... B66C 13/063; B66C 13/18; B66C 13/28; B66F 9/24; Y02E 60/50; Y02E 10/20; Y02E 10/76; Y02E 60/10; Y02E 70/30; Y02E 60/36; H02N 2/18; H01M 8/0494; H01M 10/441; H01M 2220/20; H01M 16/003; B65G 65/00; H01B 9/003; H02K 7/14; H02P 9/00; H02P 1/26; H02P 9/007; H02P 9/08; H02P 9/10; H02P 9/105

See application file for complete search history.

(56) References Cited

FOREIGN PATENT DOCUMENTS

| | | |
|---|---|---|
| JP | 2005-239377 A | 9/2005 |
| JP | 2008-247589 A | 10/2008 |
| JP | 2008-254828 A | 10/2008 |
| JP | 2012-211005 A | 11/2012 |

* cited by examiner

PORT CARGO HANDLING DEVICE AND CONTROL METHOD THEREFOR

TECHNICAL FIELD

The present invention relates to a port cargo handling device for performing a cargo handling operation at a container terminal, and a method of controlling the same, and specifically relates to a port cargo handling device capable of reducing carbon dioxide emissions and a method of controlling the same.

BACKGROUND ART

Various gantry cranes as port cargo handling devices have been proposed (see Patent Document 1, for example). Patent Document 1 discloses a configuration of a gantry crane that operates with electricity supplied through trolley lines laid in a container terminal. The carbon dioxide emissions at a container terminal can be reduced by motorizing the port cargo handling devices such as gantry cranes thereat.

A container terminal where gantry cranes equipped with diesel power generators perform cargo handling operations needs replacing the gantry cranes as well as laying trolley lines in order to motorize the gantry cranes. A problem with the motorization of an existing container terminal is a high cost. Also, laying trolley lines and replacing gantry cranes require a long-term construction and the like, during which the container terminal will not function. Thus, it has been difficult to reduce the carbon dioxide emissions at an existing container terminal.

PRIOR ART DOCUMENT

Patent Document

Patent Document 1: Japanese patent application Kokai publication No. 2003-137494

SUMMARY OF THE INVENTION

Problem to be Solved by the Invention

The present invention has been made in view of the above problem, and an object thereof is to provide a port cargo handling device capable of reducing the carbon dioxide emissions at a container terminal and a method of controlling the same.

Means for Solving the Problem

A port cargo handling device for achieving the above object is a port cargo handling device including a power generation mechanism that generates electricity and an inverter that is supplied with the electricity from the power generation mechanism, characterized in that the port cargo handling device comprises: a cable that connects the power generation mechanism and the inverter and carries DC electricity; a storage battery that is connected to this cable; and a switching mechanism, and the switching mechanism has a configuration to switch the power generation mechanism from a first power generation mechanism to a second power generation mechanism by disconnecting the first power generation mechanism and the cable from each other and connecting the cable to the second power generation mechanism, the first power generation mechanism being mounted as the power generation mechanism on the port cargo handling device, the second power generation mechanism having a fuel different from that of the first power generation mechanism.

A method of controlling a port cargo handling device for achieving the above object is a method of controlling a port cargo handling device including a power generation mechanism that generates electricity and an inverter that is supplied with the electricity from the power generation mechanism, characterized in that the power generation mechanism and the inverter are connected by a cable that carries DC electricity, and a storage battery is connected to the cable, and the power generation mechanism is switched from a first power generation mechanism to a second power generation mechanism by disconnecting the first power generation mechanism from the cable and connecting the second power generation mechanism to the cable, the first power generation mechanism being mounted as the power generation mechanism on the port cargo handling device, the second power generation mechanism having a fuel different from that of the first power generation mechanism.

Effect of the Invention

In accordance with the present invention, the power generation mechanism can be switched from the first power generation mechanism to the second power generation mechanism, which has a different fuel, by means of the switching mechanism. In this way, the fuel for the port cargo handling device can be switched from diesel oil to hydrogen, for example. This is advantageous in reducing the carbon dioxide emissions at a container terminal.

MODES FOR CARRYING OUT THE INVENTION

A port cargo handling device and a method of controlling the same will be described below based on an embodiment illustrated in drawings. In drawings, an arrow y indicates the direction of travel of the port cargo handling device, an arrow x indicates a transverse direction perpendicularly crossing this travel direction, and an arrow z indicates the vertical direction.

Figure 1:
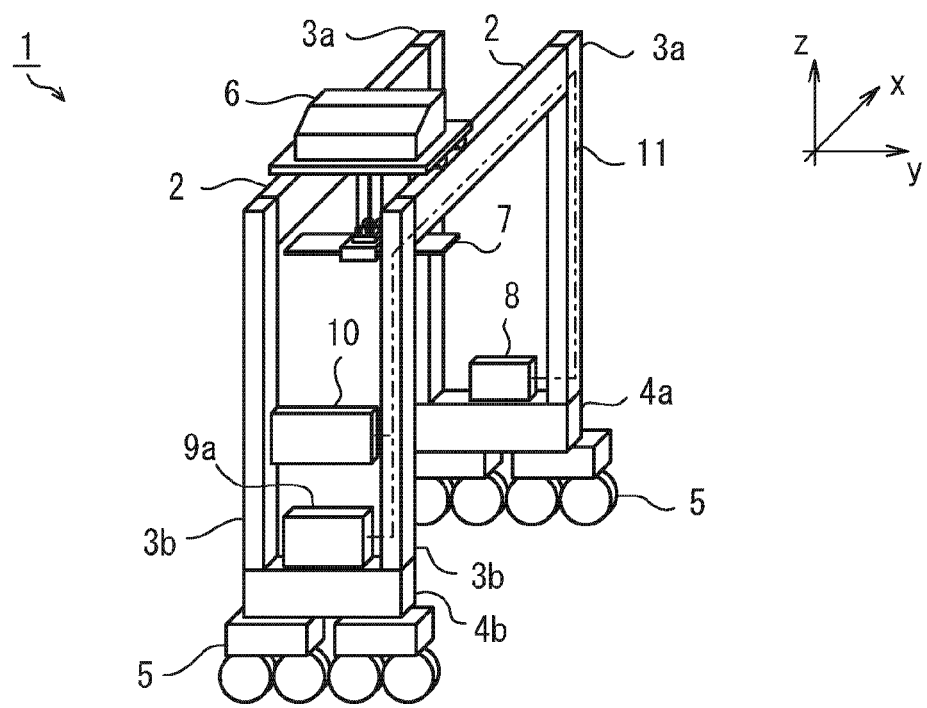
FIG. 1 is an explanatory diagram exemplarily illustrating a gantry crane as a port cargo handling device in a perspective view.

As exemplarily illustrated in FIG. 1, a port cargo handling device 1 is configured as a gantry crane, for example. The port cargo handling device 1 is not limited to a gantry crane and includes devices that perform cargo handling operations at a container terminal. Specifically, the port cargo handling device 1 includes top loaders, forklifts, straddle carriers, trailers, and the like. Also, the port cargo handling device 1 may be configured as a device for use not only at a container terminal where containers are the cargo handling target but also at a terminal, ironworks, or the like where bulk cargo of iron ore or the like is the cargo handling target.

The gantry crane has upper horizontal girders 2 extending in the transverse direction x, and legs 3 (first legs 3a and second legs 3b) respectively supporting the opposite ends of the upper horizontal girders 2. The lower ends of the pair of first legs 3a, which are disposed with a gap therebetween in the travel direction y, are coupled by a first lower horizontal girder 4a extending in the travel direction y. The lower ends of the pair of second legs 3b, which are disposed with a gap therebetween in the travel direction y, are also coupled by a second lower horizontal girder 4b extending in the travel direction y. The first lower horizontal girder 4a and the second lower horizontal girder 4b may be referred collectively as "lower horizontal girder(s) 4". Travel devices 5 having wheels are disposed on the lower side of each lower horizontal girder 4. The gantry crane also has a trolley 6 that moves in the transverse direction along the upper horizontal girders 2, and a hanging tool 7 suspended from the trolley 6 by wire rope. The port cargo handling device 1 may be configured as a gantry crane including a single upper horizontal girder 2 instead of two.

The gantry crane includes an inverter 8 installed on the first lower horizontal girder 4a, a first power generation mechanism 9a installed on the second lower horizontal girder 4b, and a storage battery 10 disposed above this first power generation mechanism 9a and fixed to the second legs 3b. In this embodiment, the inverter 8 is disposed on the upper surface of the first lower horizontal girder 4a but is not limited to this configuration. A configuration in which the inverter 8 is directly installed on the first legs 3a may be employed. Also, in this embodiment, the first power generation mechanism 9a is installed on the upper surface of the second lower horizontal girder 4b. Alternatively, a configuration in which the first power generation mechanism 9a is directly installed on the second legs 3b may be employed. Also, the storage battery 10 is not limited to the configuration of being fixed to the second legs 3b. The storage battery 10 may be installed on the upper surface of the second lower horizontal girder 4b or installed on the first legs 3a or the first lower horizontal girder 4a. The inverter 8 and the first power generation mechanism 9a are connected by a cable 11 laid along a leg 3 and an upper horizontal girder 2. In FIG. 1, the cable 11 is illustrated with a long dashed short dashed line for the sake of explanation.

The first power generation mechanism 9a has a diesel power generator that generates electricity by using diesel oil as its fuel. The electricity generated by the first power generation mechanism 9a is sent to the inverter 8 through the cable 11. The inverter 8 has a configuration to adjust the current, voltage, and frequency and then supply the resulting AC electricity to the motors of the travel devices 5 and the trolley 6 and so on.

The storage battery 10 is connected to the cable 11. The storage battery 10 has a configuration to charge electricity supplied from the first power generation mechanism 9a and supply electricity to the inverter 8, for example. The storage battery 10 may be configured to be fixed to the first legs 3a or installed on the lower horizontal girder 4, for example.

The positions to install the first power generation mechanism 9a and the inverter 8 are not limited to the upper surfaces of the lower horizontal girders 4. The positions to install the first power generation mechanism 9a and the like can be changed as appropriate based on the device configured as the port cargo handling device 1.

Figure 2:
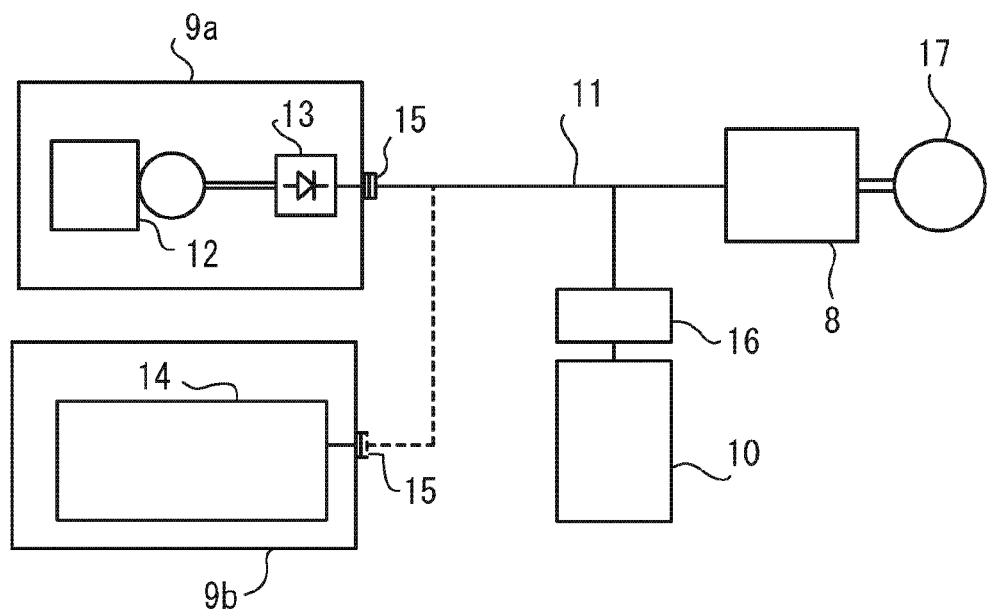
FIG. 2 is an explanatory diagram exemplarily and schematically illustrating power generation mechanisms and an inverter in a connected state.

As exemplarily illustrated in FIG. 2, the first power generation mechanism 9a has a diesel power generator 12 and a rectifier 13 that converts the AC electricity generated by the diesel power generator 12 into DC electricity. Since the first power generation mechanism 9a has the rectifier 13, the electricity output from the first power generation mechanism 9a to the cable 11 is DC electricity. The diesel power generator 12 is coupled to a separate fuel tank not illustrated that is disposed on the lower horizontal girder 4 or the like. The fuel tank may be disposed inside the first power generation mechanism 9a. The fuel for the first power generation mechanism 9a is diesel oil.

A second power generation mechanism 9b has a fuel cell 14 that generates electricity with hydrogen as its fuel, for example. The second power generation mechanism 9b has a configuration to output DC electricity to the cable 11. The fuel cell 14 is coupled to a separate fuel tank not illustrated that is disposed on the lower horizontal girder 4 or the like. The fuel tank may be disposed inside the second power generation mechanism 9b. The fuel for the second power generation mechanism 9b is hydrogen.

The configuration of the second power generation mechanism 9b is not limited to the above. It suffices that the second power generation mechanism 9b is configured as a power generation mechanism 9 with less carbon dioxide emissions than the first power generation mechanism 9a. The second power generation mechanism 9b is not limited to a fuel cell and may include a combination of a hydrogen engine that uses hydrogen as its fuel and a power generator. Also, the fuel for the second power generation mechanism 9b is not limited to hydrogen. The fuel may be ammonium or a hydrogen compound. Also, the fuel may be made of an alkane with a relatively small number of carbon atoms (four or less carbon atoms), such as methane or ethane. It suffices that the fuel is one that causes less carbon dioxide emissions than diesel oil.

The port cargo handling device 1 includes a switching mechanism 15 that switches the power generation mechanism 9 connected to the inverter 8 through the cable 11 from the first power generation mechanism 9a to the second power generation mechanism 9b. The switching mechanism 15 includes a plug 15a that allows the cable 11 to be attached to and detached from the power generation mechanism 9, for example. This switching mechanism 15 allows only one of the first power generation mechanism 9a or the second power generation mechanism 9b to be connected to the inverter 8 through the cable 11. In FIG. 2, the switching mechanism 15 and the cable 11 in the state where the second power generation mechanism 9b is connected are illustrated with dashed lines for the sake of explanation. The switching mechanism 15 may be configured as a switch that switches an electrical connection between the first power generation mechanism 9a and the second power generation mechanism 9b.

The storage battery 10 is connected to the cable 11 through a controller 16. The controller 16 has a configuration to control supply of electricity from the power generation mechanism 9 to the storage battery 10, supply of regenerative electricity from the inverter 8 to the storage battery 10, and supply of electricity from the storage battery 10 to the inverter 8. The controller 16 is not an essential element in the present invention. The storage battery 10 is directly connected to the cable 11 when the storage battery 10 does not need the controller 16.

The electricity supplied from the power generation mechanism 9 or the storage battery 10 is fed to motors 17 of the travel devices 5 and the like through the inverter 8. Also, regenerative electricity which the motors 17 generate when lowering cargo is accumulated in the storage battery 10 through the inverter 8 and the controller 16.

Next, switching of the fuel in the port cargo handling device 1 will be described. Assume that there is a container terminal at which multiple gantry cranes each including the first power generation mechanism 9a using diesel oil as its fuel perform cargo handling operations, as has been done conventionally. For example, a hydrogen supply system is gradually built at the container terminal by increasing the number of hydrogen storage tanks, etc. In response to this, the fuel for some of the port cargo handling devices 1 can be switched from diesel oil to hydrogen. Specifically, the switching mechanism 15 disconnects the cable 11 and the first power generation mechanism 9a from each other and then connects the cable 11 and the second power generation mechanism 9b to each other.

The fuel for the port cargo handling devices 1 at the container terminal can be sequentially switched to a fuel with less carbon dioxide emissions. The fuel for each port cargo handling device 1 can be sequentially switched from diesel oil to hydrogen according to the progress of development of the hydrogen supply system for the container terminal. At an existing container terminal, operations such as installing hydrogen tanks can be performed without having to stop the cargo handling operations. Also, when switching the power generation mechanism 9, it is possible to reduce its impact on the cargo handling operations by preferentially switching the power generation mechanism 9 of the port cargo handling device 1 that is stopped and not performing a cargo handling operation.

The port cargo handling devices 1 that are not the fuel switching target can continue their cargo handling operations, so that the container terminal's function does not need to be stopped. The fuel for the multiple port cargo handling devices 1 at the container terminal can be switched from diesel oil to hydrogen by several devices in turn. The container terminal can continue its cargo handling operations even when port cargo handling devices 1 using diesel oil as their fuel and port cargo handling devices 1 using hydrogen as their fuel are both present at the container terminal. The above method is particularly advantageous in reducing the carbon dioxide emissions at an existing container terminal.

It is desirable that the rated output of the first power generation mechanism 9a and the rated output of the second power generation mechanism 9b be nearly equal. Each power generation mechanism 9 is desirably originally designed such that the rated output of the second power generation mechanism 9b is in the range of from 90% to 110% (in the range of ±10%) of the rated output of the first power generation mechanism 9a. Specifically, the rated output of the first power generation mechanism 9a is set to 70 kW and the rated output of the second power generation mechanism 9b is set to 75 kW, for example.

By setting the rated outputs of the first power generation mechanism 9a and the second power generation mechanism 9b to nearly equal values, the power generation mechanism 9 can be easily changed. For example, operations such as changing the capacity of the storage battery 10 will be unnecessary. The capacity of the storage battery 10 is originally designed based on the rated outputs of the first power generation mechanism 9a and the second power generation mechanism 9b, the maximum power required for operation of the port cargo handling device 1, and the like. Thus, a port cargo handling device 1 that has been able to perform a cargo handling operation by utilizing electricity from the first power generation mechanism 9a can resume the cargo handling operation by only switching the first power generation mechanism 9a to the second power generation mechanism 9b by means of the switching mechanism 15.

Also, the first power generation mechanism 9a and the second power generation mechanism 9b both have a configuration to output DC electricity. This eliminates the need for operations such as changing from a configuration for handling AC electricity to a configuration for handling DC electricity for the cable 11, the storage battery 10, and the like when changing the power generation mechanism 9. Thus, operations such as installing a device for DC-to-AC conversion and a device to AC-to-DC conversion will be unnecessary.

The configuration of the port cargo handling device 1 may be such that both the first power generation mechanism 9a and the second power generation mechanism 9b are mounted. In this case, the power generation mechanism 9 can be easily switched by switching the electrical connection between the power generation mechanism 9 and the cable 11. The first power generation mechanism 9a and the second power generation mechanism 9b are both installed on one of the lower horizontal girders 4, or each power generation mechanism 9 is installed on a different lower horizontal girder 4.

Incidentally, the configuration may be such that only the first power generation mechanism 9a is originally mounted on the port cargo handling device 1, and the first power generation mechanism 9a is replaced with the second power generation mechanism 9b in a case of switching the power generation mechanism 9. The configuration to switch the power generation mechanism 9 mounted on the port cargo handling device 1 from the first power generation mechanism 9a to the second power generation mechanism 9b can reduce the weight of the port cargo handling device 1. The configuration can also avoid a state where an unused unnecessary device is mounted on the port cargo handling device 1.

Figure 3:
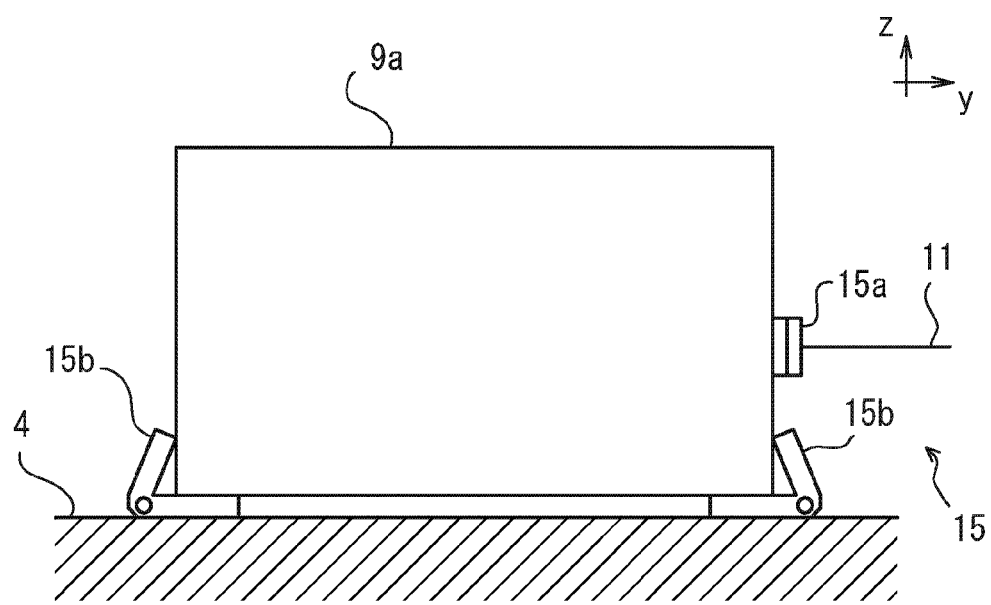
FIG. 3 is an explanatory diagram exemplarily illustrating a switching mechanism.

As exemplarily illustrated in FIG. 3, the switching mechanism 15 may have couplers 15b that couple the first power generation mechanism 9a to the lower horizontal girder 4 of the port cargo handling device 1 or the like. The couplers 15b have a configuration to fix and unfix the power generation mechanism 9 to and from the port cargo handling device 1. In this embodiment, the switching mechanism 15 includes the plug 15a, which connects the cable 11 and the power generation mechanism 9, and the couplers 15b, which couples the power generation mechanism 9 and the lower horizontal girder 4 or the like.

To change the power generation mechanism 9, first, the plug 15a is disconnected to detach the cable 11 from the first power generation mechanism 9a. Also, the couplers 15b uncouple the first power generation mechanism 9a and the lower horizontal girder 4 from each other. The first power generation mechanism 9a is removed from the port cargo handling device 1.

Figure 4:
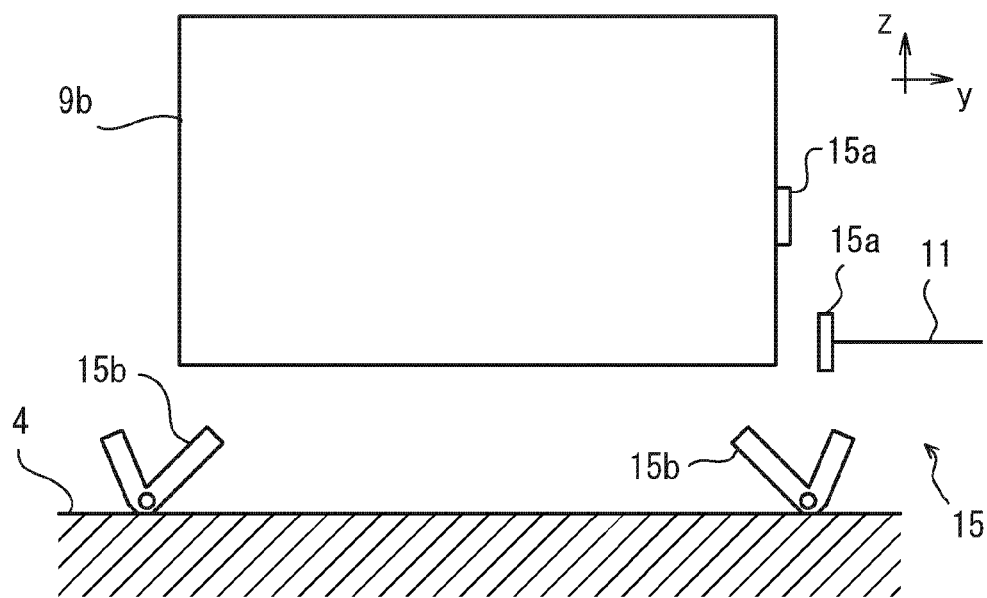
FIG. 4 is an explanatory diagram illustrating the switching mechanism in FIG. 3 in an actuated state.

As exemplarily illustrated in FIG. 4, the second power generation mechanism 9b is installed at the position where the first power generation mechanism 9a was installed. The couplers 15b couple the second power generation mechanism 9b and the lower horizontal girder 4. Also, the plug 15a connects the cable 11 to the second power generation mechanism 9b. By the above, the power generation mechanism 9 mounted on the port cargo handling device 1 is switched from the first power generation mechanism 9a to the second power generation mechanism 9b.

When each power generation mechanism 9 has a separate fuel tank, the diesel oil tank is removed from the port cargo handling device 1 and the hydrogen tank is mounted. If the diesel oil tank and the hydrogen tank are disposed inside the respective power generation mechanisms 9, the diesel oil tank and the like are replaced when the power generation mechanism 9 is replaced.

The fuel for the port cargo handling device 1 can be easily switched by replacing the power generation mechanism 9. The port cargo handling device 1 having the switching mechanism 15 can easily handle switching of its fuel in the future. For example, at a container terminal where the fuel is expected to switch, for instance, from diesel oil to hydrogen in the future, port cargo handling devices 1 being gantry cranes or the like having the first power generation mechanism 9a and the switching mechanism 15 or the like are installed in advance. If the amount of supply of hydrogen increases, the first power generation mechanisms 9a of the gantry cranes or the like are accordingly and sequentially replaced with the second power generation mechanism 9b. In the case of a container terminal of a scale with several tens to several hundred of port cargo handling devices 1 being gantry cranes or the like, it is possible to effectively switch the fuel from diesel oil to hydrogen, for example, while maintaining the container terminal's cargo handling function.

As exemplarily illustrated in FIG. 2, the first power generation mechanism 9a includes the rectifier 13. Thus, the rectifier 13 can be removed from the port cargo handling device 1 at the same time as when the first power generation mechanism 9a is removed from the port cargo handling device 1 and the second power generation mechanism 9b is installed. Unnecessary devices such as the rectifier 13 will not be left in the port cargo handling device 1. This is advantageous in making the port cargo handling device 1 lighter in weight.

Figure 5:
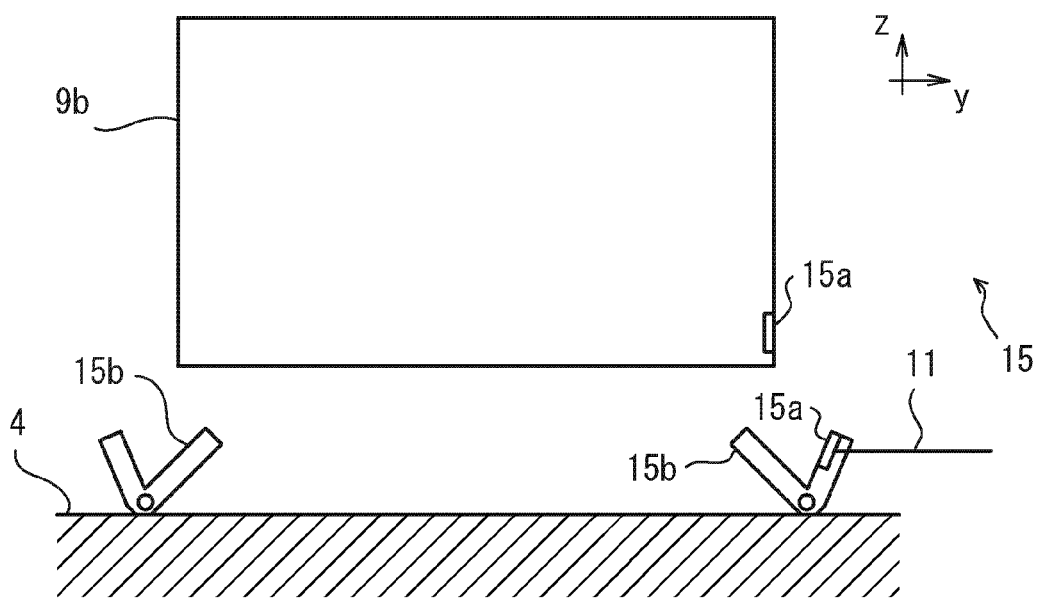
FIG. 5 is an explanatory diagram exemplarily illustrating a modification of FIG. 4.

A configuration in which the switching mechanism 15 automatically connects and disconnects the cable 11 as exemplarily illustrated in FIG. 5 may be employed. Also, a configuration in which the switching mechanism 15 automatically fixes and unfixes the power generation mechanism 9 to and from the port cargo handling device 1 may be employed. For example, a configuration in which a coupler 15b incorporates the contact part of the plug 15a may be employed.

By lifting up the first power generation mechanism 9a from the lower horizontal girder 4 or the like, the couplers 15b tilt about the transverse direction x as a center axis. The tilt of the couplers 15b automatically unfixes the first power generation mechanism 9a from the port cargo handling device 1 and also automatically electricity disconnects the first power generation mechanism 9a and the cable 11 from each other. When the second power generation mechanism 9b is mounted on the lower horizontal girder 4 or the like, the couplers 15b are tilted about the transverse direction x as a center axis due to contact with the second power generation mechanism 9b and thereby brought into a fixing state. By being in this fixing state, the couplers 15b can the second power generation mechanism 9b to the port cargo handling device 1. As the couplers 15b are tilted, the plug 15a in a coupler 15b gets electrically connected to the plug 15a in the second power generation mechanism 9b.

The first power generation mechanism 9a can be replaced with the second power generation mechanism 9b in a relatively short time. Thus, the port cargo handling device 1, which is a gantry crane or the like, will hardly need a wait time. It is possible to switch the fuel for the port cargo handling device 1 without lowering the efficiency of cargo handling at the container terminal. This is advantageous in promoting a hydrogen fuel or the like which causes less carbon dioxide emissions.

EXPLANATION OF REFERENCE NUMERALS 1 port cargo handling device
2 upper horizontal girder
3 leg
3a first leg
3b second leg
4 lower horizontal girder
4a first lower horizontal girder
4b second lower horizontal girder
5 travel device
6 trolley
7 hanging tool
8 inverter
9 power generation mechanism
9a first power generation mechanism
9b second power generation mechanism
10 storage battery
11 cable
12 diesel power generator
13 rectifier
14 fuel cell
switching mechanism
15a plug
15b coupler
16 controller
17 motor
x transverse direction
y travel direction
z vertical direction

The invention claimed is:

1. A port cargo handling device including a power generation mechanism that generates electricity and an inverter that is supplied with the electricity from the power generation mechanism, characterized in that the port cargo handling device comprises:
   a cable that connects the power generation mechanism and the inverter and carries DC electricity;
   a storage battery that is connected to this cable; and
   a switching mechanism, and
   the switching mechanism has a configuration to switch the power generation mechanism from a first power generation mechanism to a second power generation mechanism by disconnecting the first power generation mechanism and the cable from each other and connecting the cable to the second power generation mechanism, the first power generation mechanism being mounted as the power generation mechanism on the port cargo handling device, the second power generation mechanism having a fuel different from that of the first power generation mechanism.

2. The port cargo handling device according to claim 1, wherein
   the switching mechanism has a coupler that makes the power generation mechanism attachable to and detachable from the port cargo handling device, and
   the coupler has a configuration to uncouple the first power generation mechanism and the port cargo handling device from each other and couple the second power generation mechanism and the port cargo handling device to each other.

3. The port cargo handling device according to claim 1, wherein
the first power generation mechanism has a diesel power generator and a rectifier that converts AC electricity output from this diesel power generator into DC electricity, and has a configuration to output the DC electricity, and
the second power generation mechanism has a fuel cell and has a configuration to output DC electricity.

4. The port cargo handling device according to claim 1, wherein a rated output of the second power generation mechanism is originally set in a range of from 90% to 110% of a rated output of the first power generation mechanism.

5. The port cargo handling device according to claim 1, wherein
the port cargo handling device is configured as a crane including
an upper horizontal girder extending in a transverse direction perpendicularly crossing a travel direction,
a first leg supporting one end side of this upper horizontal girder, and
a second leg disposed with a gap between this first leg and the second leg in the transverse direction and supporting another end side of the upper horizontal girder, and
the port cargo handling device has a configuration in which the inverter is disposed on a first lower horizontal girder fixed to a lower end of the first leg and extending in the travel direction, and the power generation mechanism and the storage battery are disposed on a second lower horizontal girder fixed to a lower end of the second leg and extending in the travel direction, and has a configuration in which the cable is laid in such a state as to extend from the first leg to the second leg by way of the upper horizontal girder.

6. A method of controlling a port cargo handling device including a power generation mechanism that generates electricity and an inverter that is supplied with the electricity from the power generation mechanism, characterized in that the power generation mechanism and the inverter are connected by a cable that carries DC electricity, and a storage battery is connected to the cable, and
the power generation mechanism is switched from a first power generation mechanism to a second power generation mechanism by disconnecting the first power generation mechanism from the cable and connecting the second power generation mechanism to the cable, the first power generation mechanism being mounted as the power generation mechanism on the port cargo handling device, the second power generation mechanism having a fuel different from that of the first power generation mechanism.

7. The method of controlling a port cargo handling device according to claim 6, wherein when the power generation mechanism is switched from the first power generation mechanism to the second power generation mechanism, the first power generation mechanism, which is coupled to the port cargo handling device with a coupler, is released from the coupled state by the coupler and removed from the port cargo handling device, and then the second power generation mechanism is coupled to the port cargo handling device with the coupler.

8. The method of controlling a port cargo handling device according to claim 6, wherein
the first power generation mechanism has a diesel power generator and a rectifier that converts AC electricity output from this diesel power generator into DC electricity, and has a configuration to output the DC electricity, and
the second power generation mechanism has a fuel cell and has a configuration to output DC electricity.

9. The method of controlling a port cargo handling device according to claim 6, wherein a rated output of the second power generation mechanism is originally set in a range of from 90% to 110% of a rated output of the first power generation mechanism.

* * * * *